United States Patent
Lacivita et al.

(10) Patent No.: US 11,881,583 B2
(45) Date of Patent: Jan. 23, 2024

(54) POSITIVE ELECTRODE ACTIVE MATERIAL AND ELECTROCHEMICAL CELL COMPRISING THE POSITIVE ELECTRODE ACTIVE MATERIAL

(71) Applicant: Samsung Electronics Co., Ltd., Suwon-si (KR)

(72) Inventors: Valentina Lacivita, Cambridge, MA (US); Yongwoo Shin, Concord, MA (US); Samuel Robert Cross, Cambridge, MA (US)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 117 days.

(21) Appl. No.: 17/672,178

(22) Filed: Feb. 15, 2022

(65) Prior Publication Data

US 2023/0187634 A1 Jun. 15, 2023

Related U.S. Application Data

(60) Provisional application No. 63/289,665, filed on Dec. 15, 2021.

(51) Int. Cl.
*H01M 4/00* (2006.01)
*H01M 4/58* (2010.01)
*H01M 4/02* (2006.01)

(52) U.S. Cl.
CPC ......... *H01M 4/5825* (2013.01); *H01M 4/582* (2013.01); *H01M 4/5815* (2013.01); *H01M 2004/028* (2013.01)

(58) Field of Classification Search
CPC .... H01M 4/525; H01M 10/052; H01M 4/386; H01M 10/0566; H01M 4/366; H01M 2004/028; Y02E 60/10
See application file for complete search history.

(56) References Cited

U.S. PATENT DOCUMENTS

| 10,411,248 | B2 | 9/2019 | Marusczyk et al. |
| 10,957,903 | B2 | 3/2021 | Yang et al. |
| 11,710,823 | B2* | 7/2023 | Kawakami ............ H01M 4/505 427/126.3 |
| 2011/0008678 | A1 | 1/2011 | Li et al. |
| 2015/0372302 | A1 | 12/2015 | Li et al. |
| 2017/0237123 | A1* | 8/2017 | Yoon ................ H01M 10/0569 429/333 |

(Continued)

OTHER PUBLICATIONS

Ornek, A. "The synthesis of novel LiNiPO4 core and Co3O4/CoO shell materials by combining them with hard-template and solvothermal routes," Journal of Colloid and Interface Science, vol. 504, 2017; pp. 468-478.

(Continued)

*Primary Examiner* — Cynthia H Kelly
*Assistant Examiner* — Monique M Wills
(74) *Attorney, Agent, or Firm* — CANTOR COLBURN LLP

(57) ABSTRACT

A positive electrode active material includes a doped lithium nickel phosphate having an olivine structure comprising distorted NiO$_6$ octahedra. The dopant is an anion; or a combination of at least two transition metals having different ionic radii; or an anion and a metal cation. The positive electrode active material can be used in a positive electrode for an electrochemical cell.

20 Claims, 2 Drawing Sheets

(56) References Cited

U.S. PATENT DOCUMENTS

| | | | | |
|---|---|---|---|---|
| 2017/0331116 A1* | 11/2017 | Awano | ............... | H01M 4/136 |
| 2018/0053936 A1* | 2/2018 | Sato | ............... | H01M 4/525 |
| 2020/0365874 A1 | 11/2020 | Wang et al. | | |
| 2021/0226205 A1 | 7/2021 | Park et al. | | |

OTHER PUBLICATIONS

Ornek, A. et al., "A novel and effective strategy for producing core-shell LiNiPO4/C cathode material for excellent electrochemical stability using a long-time and low-level microwave approach," Scropta Materialia, vol. 122, 2016; pp. 45-49.

Padhi, A. K. "Phospho-olivines as Positive-Electrode Materials for Rechargeable Lithium Batteries," Journal of the Electrochemical Society, vol. 144, No. 4, Apr. 1997; 8 pages.

Surthi, K. K. et al., "Shape controlled and structurally stabilized Co-doped olivine lithium phosphate cathodes for high voltage conventional, thin and flexible Li-ion batteries," Chemical Engineering Journal, vol. 399, 2020; 15 pages.

Wang, L. "Ab Initio Study of the Surface Properties and Nanoscale Effects of LiMnPO4," Electrochemical and Solid-State Letters, vol. 11, No. 6, 2008; pp. A94-A96.

Wolfenstine, J. et al., "Ni3+/Ni2+ redox potential in LiNiPO4," Journal of Power Sources, vol. 142, 2005; pp. 389-390.

\* cited by examiner

POSITIVE ELECTRODE ACTIVE MATERIAL AND ELECTROCHEMICAL CELL COMPRISING THE POSITIVE ELECTRODE ACTIVE MATERIAL

CROSS-REFERENCE TO RELATED APPLICATION

This application claims priority to U.S. Provisional Patent Application No. 63/289,665, filed on Dec. 15, 2021, in the United States Patent and Trademark Office, and all the benefits accruing therefrom under 35 U.S.C. § 119, the content of which is incorporated herein in its entirety by reference.

BACKGROUND

(1) Field

Disclosed is a positive electrode active material, a positive electrode comprising the positive electrode active material, and a method for the manufacture thereof. Also disclosed is an electrochemical cell comprising the positive electrode active material.

(2) Description of the Related Art

Currently available positive electrode materials for lithium-ion batteries can limit the energy density and dominate the cost of the battery. Current commercial lithium-ion batteries generally employ intercalation oxide cathodes, for example layered oxides such as $LiCoO_2$ (LCO), having an operating voltage of about 4 volts and a practical capacity of 140 mAh/g. However, $LiCoO_2$ is expensive and a stable supply is not ensured. As an alternative to $LiCoO_2$ cathode active materials including nickel and manganese have been developed. Nonetheless, there remains a continuing need in the art for improved high voltage positive electrode materials, particularly for rechargeable batteries capable of satisfying greater device performance demands.

SUMMARY

Disclosed is a positive electrode active material comprising: a doped lithium nickel phosphate having an olivine structure comprising distorted $NiO_6$ octahedra, wherein the dopant is an anion; or a combination of at least two transition metals having different ionic radii; or an anion and a metal cation.

Also disclosed is a positive electrode comprising the positive electrode active material.

Also disclosed is an electrochemical cell comprising: the positive electrode comprising the positive electrode active material; a negative electrode; and a separator between the positive electrode and the negative electrode.

Also disclosed is an electrochemical cell comprising: the positive electrode comprising the positive electrode active material; a negative electrode; and a solid electrolyte between the positive electrode and the negative electrode.

DETAILED DESCRIPTION

Current commercial lithium-ion batteries generally employ intercalation oxide cathodes, for example layered oxides such as $LiCoO_2$ (LCO). Polyanion oxides can offer several advantages compared to layered oxides including high thermal stability, improved safety, and can sustain high voltages due to the so-called "inductive effect." In particular, among the 3d transition metals, nickel (Ni) can provide the highest cell voltage and increased capacity.

Ni-rich oxides have attracted interest due to their low price and high discharge capacities compared to commercial LCO materials. However, Ni-based polyanion compounds such as olivine $LiNiPO_4$ (LNP) can be difficult to activate electrochemically. Without wishing to be bound by theory, it is believed that due to the polyanion inductive effect on the transition metal, the Ni d states are lowered such that the voltage becomes limited by the oxidation of the anion. Accordingly, polyanion oxides can have low electrical conductivity, hindering lithium insertion/de-insertion.

Figures 1A, 1B, 1C:
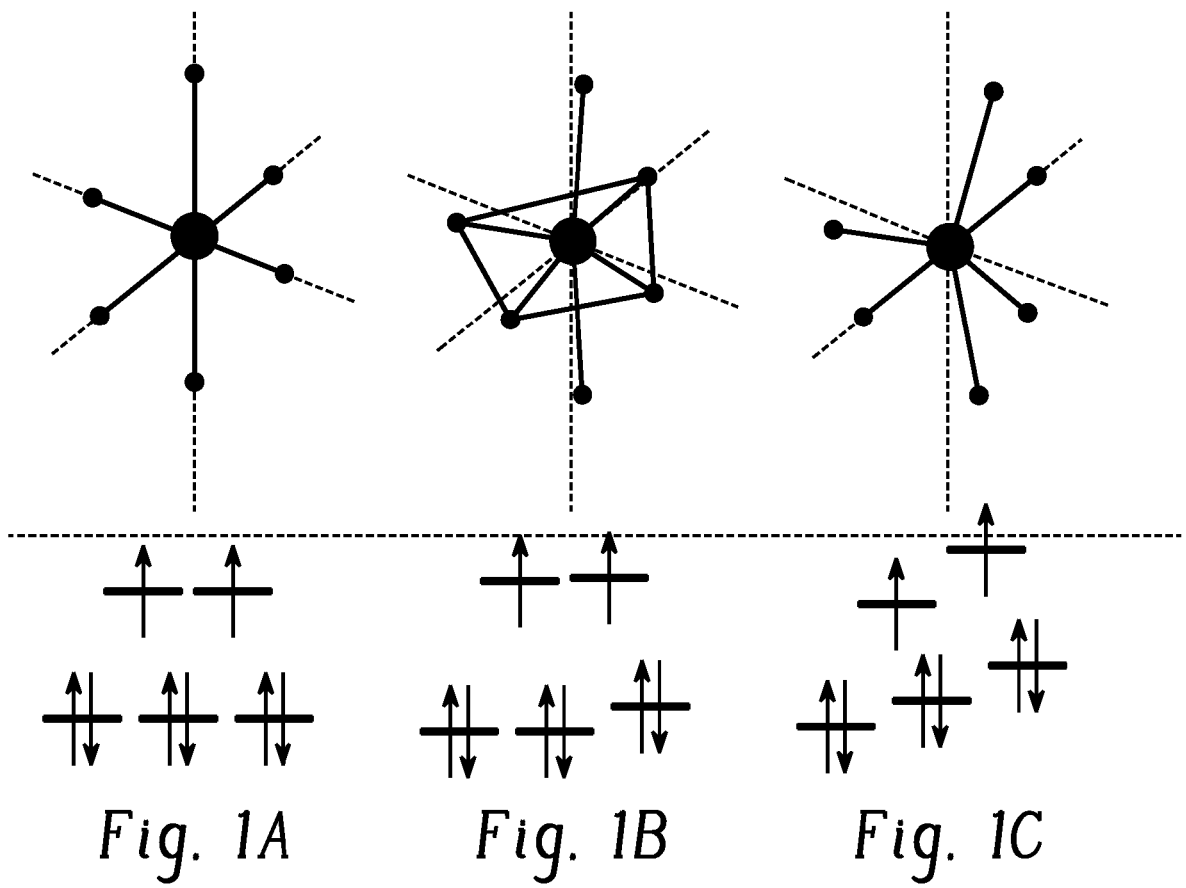
FIG. 1A is a schematic diagram showing transition metal d orbital energies when in octahedral coordination.
FIGS. 1B and 1C are schematic diagrams showing transition metal d orbital energies when the octahedral coordination is distorted.

The present inventors have unexpectedly discovered that distortion in the $NiO_6$ octahedra of $LiNiPO_4$ can result in energy level splitting that favors electrochemical activation. In octahedral coordination, the Ni d orbitals have 3-fold degenerate $t_{2g}$ states and 2-fold degenerate $e_g$ states. Breaking the octahedral symmetry can cause splitting of the d states, as shown schematically in FIG. 1A to 1C. FIG. 1A shows the d orbitals in an undistorted configuration, and FIGS. 1B and 1C the d orbitals with different degrees of distortion. Complete splitting of the d states shifts the highest energy state at the Fermi level, resulting in improved electrical conductivity, as shown in FIGS. 1B and 1C, which illustrate that when the octahedral symmetry is broken, the d states split, resulting in a shift of the d electrons near the Fermi level to higher energy. The shift of the d electrons to higher energy levels advantageously allows activation of the $Ni^{2+/3+}$ redox before anion oxidation.

Figure 2:
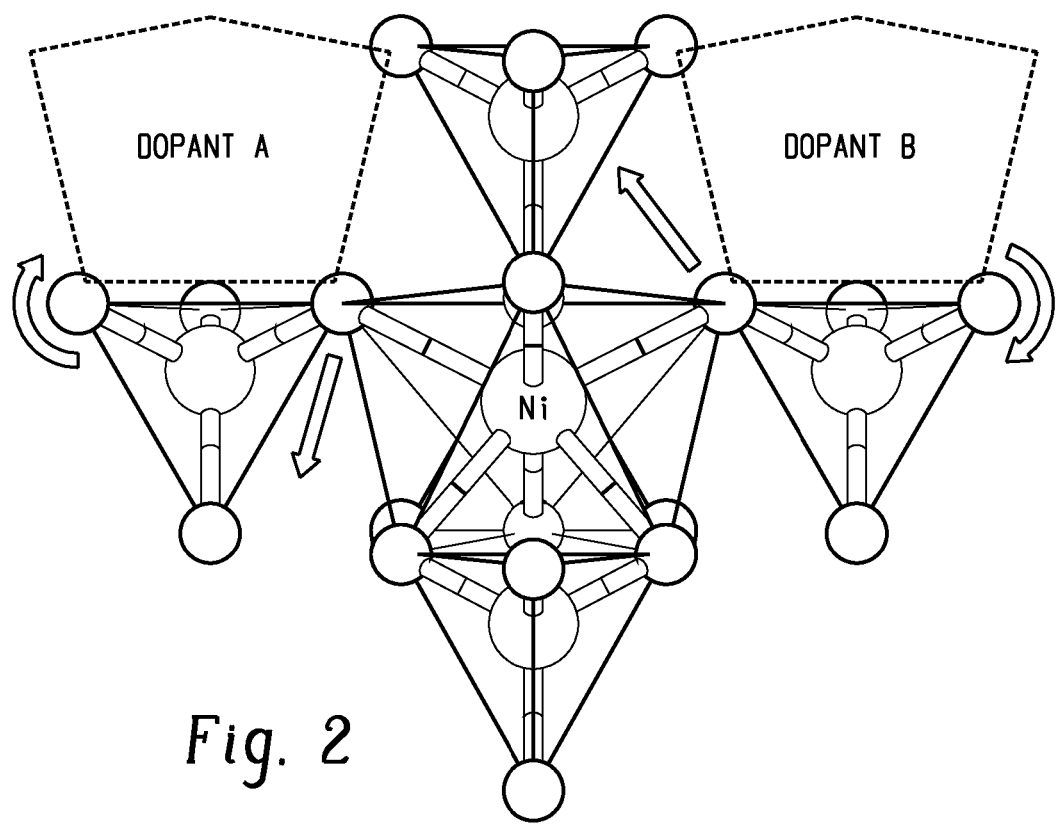
FIG. 2 is a schematic diagram showing distortion of the Ni octahedral sites from doping with large ("Dopant A") and small ("Dopant B") cation dopants.
Figure 3:
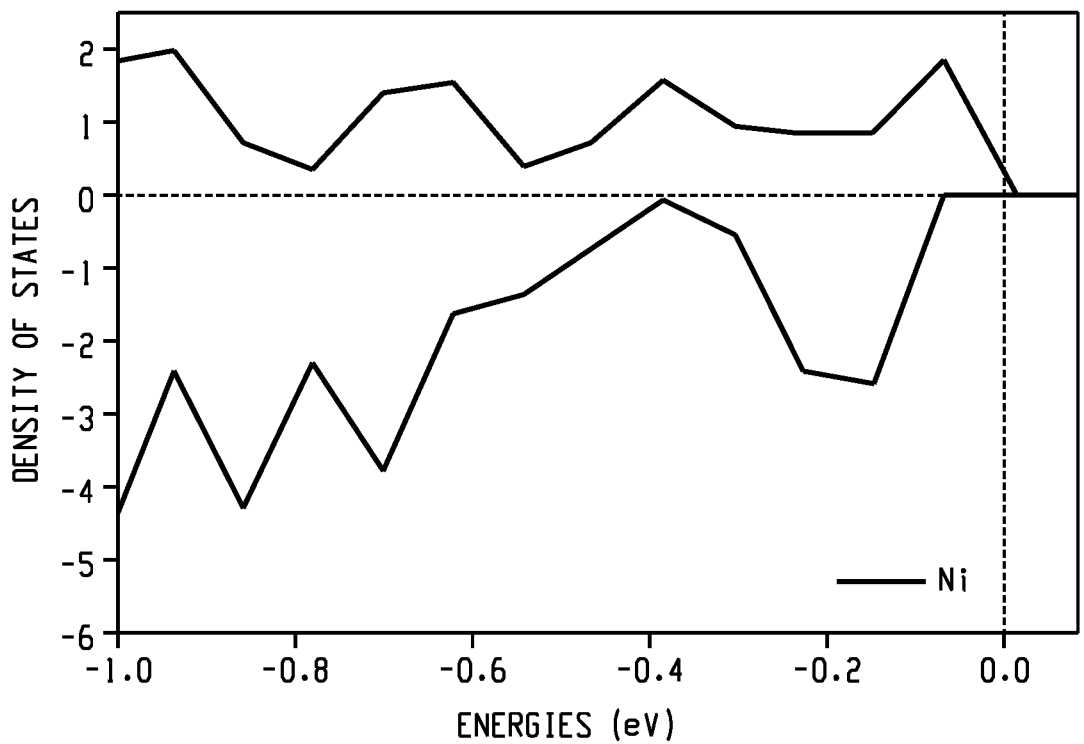
FIG. 3 is graph of density of states versus energy (eV) showing the effect of Zn and Sr doping on Ni d orbitals.
Figure 4:
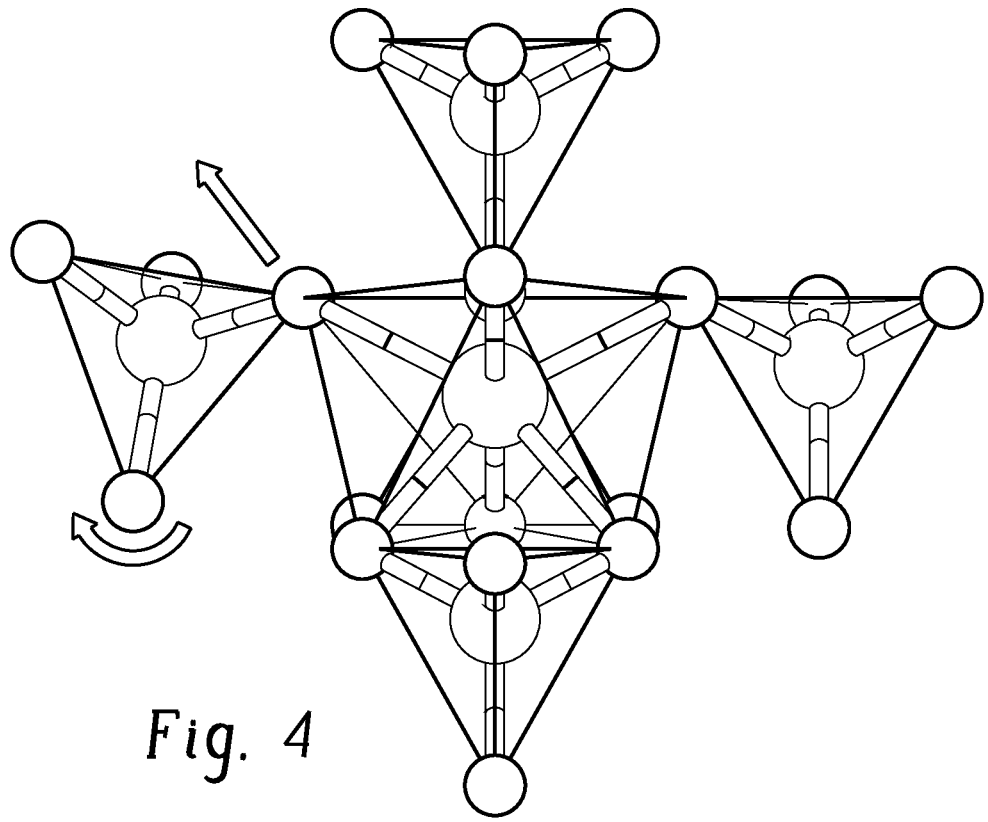
FIG. 4 is a schematic diagram showing distortion of the Ni octahedral sites from doping with an anion dopant.

Disclosed is a positive electrode active material comprising a doped lithium nickel phosphate having an olivine structure comprising distorted $NiO_6$ octahedra. Specifically, the present inventors have unexpectedly found that particular dopants (e.g., an anion, a combination of at least two transition metals having different ionic radii, or a combination of an anion and a metal cation) can provide distorted $NiO_6$ octahedra and the desired effects on Ni coordination and the Ni d orbitals. As shown schematically in FIG. 2, use of selected cation dopants having different ionic radii, e.g., a large cation dopant and small cation dopant, can provide the desired distortion of the Ni octahedral sites, resulting in the desired effect on Ni d orbitals to provide high-energy states near the Fermi level. This effect is shown for the dopants Zn and Sr in FIG. 3, which illustrates the high-energy Ni states near the Fermi level when $LiNiPO_4$ is doped with Zn and Sr. Alternatively, anion doping can be used to distort the Ni octahedral sites, with similar effect on the Ni d orbitals. The effect of anion doping is shown schematically in FIG. 4, which illustrates distortion of the Ni octahedral sites when an oxygen of the $PO_4$ group is substituted with an anionic dopant A.

The doped lithium nickel phosphate can be useful as a positive electrode active material.

A doped lithium nickel phosphate represents an aspect of the present disclosure. The doped lithium nickel phosphate has an olivine-type structure comprising distorted $NiO_6$ octahedra. The dopant may be an anion, a combination of at least two transition metals having different ionic radii, or a combination of an anion and a metal cation. "Olivine" or "olivine-type structure" as used herein means that the compound has a crystal structure that is isostructural with olivine, $(Mg_xFe_{(1-x)})_2SiO_4$, wherein $0 \leq x \leq 1$, disregarding the distortion provided by the dopant.

In an aspect, the dopant is the combination of at least two transition metals having different ionic radii. The doped lithium nickel phosphate can be a compound according to Formula 1

$$Li_{1+x(2-p)+y(2-q)}M^1{}_x{}^pM^2{}_y{}^qNi_{1-x-y}PO_4 \quad \text{Formula 1}$$

wherein, in Formula 1, $M^1$ is a transition metal having an oxidation state p, wherein p is +1, +2, +3, or +4, $M^2$ is a transition metal having an oxidation state q, wherein q is +1, +2, +3, or +4, $0 < x \leq 0.25$; $0 < y \leq 0.25$; and $M^1$ has an ionic radius that is not equal to $M^2$. In an aspect, $0.01 \leq x \leq 0.25$, or $0.05 \leq x \leq 0.25$, or $0.1 \leq x \leq 0.25$, or $0.15 \leq x \leq 0.25$, or $0.1 \leq x \leq 0.2$. In an aspect, $0.01 \leq y \leq 0.25$, or $0.05 \leq y \leq 0.25$, or $0.1 \leq y \leq 0.25$, or $0.15 \leq y \leq 0.25$, or $0.1 \leq y \leq 0.2$. A transition metal is an element of Groups 3 to 12 of the Periodic table.

In an aspect, the ionic radii of $M^1$ and $M^2$ are not equal to the ionic radius of Ni. For example, $M^1$ can have an ionic radius less than or equal to 0.65 Å and $M^2$ can have an ionic radius greater than or equal to 0.73 Å. $M^1$ can have an ionic radius of 0.53 to 0.65 Å, and $M^2$ can have an ionic radius of 0.73 to 1.2 Å. $M^1$ can have an ionic radius less than 0.69 Å and $M^2$ can have an ionic radius greater than 0.69 Å. $M^1$ and $M^2$ can each have an ionic radius that is greater than or equal to 0.73 Å. $M^1$ and $M^2$ can each have an ionic radius of 0.73 to 1.2 Å.

In Formula 1, $M^1$ and $M^2$ can be each independently Al, Sc, Fe, Co, Cu, Zn, Ga, As, Y, In, Sb, Sr, Ag, Cd, Sn, Hg, or Pb, provided that $M^1$ and $M^2$ are not the same. For example, $M^1$ and $M^2$ can be each independently Fe, Co, Zn, or Sr, provided that $M^1$ and $M^2$ are not the same. In an aspect, $M^1$ can be Al, Fe, Co, Ga, or As. In an aspect, $M^2$ can be Sc, Cu, Zn, Y, In, Sb, Sr, Ag, Cd, Sn, Hg, or Pb. In an aspect, $M^1$ can be Zn and $M^2$ can be Sr, $0.1 \leq x \leq 0.25$, and $0.1 \leq y \leq 0.25$. In an aspect, $M^1$ can be Co and $M^2$ can be Sr, $0.1 \leq x \leq 0.25$, and $0.1 \leq y \leq 0.25$. In an aspect, $M^1$ can be Fe and $M^2$ can be Sr, $0.1 \leq x \leq 0.25$, and $0.1 \leq y \leq 0.25$.

In an aspect, $M^1$ and $M^2$ can each have an oxidation state of +2, and the doped lithium nickel phosphate can be a compound of Formula 1a

$$LiM^1{}_xM^2{}_yNi_{1-x-y}PO_4 \quad \text{Formula 1a}$$

Exemplary doped lithium nickel phosphate compounds can include, but are not limited to, $LiZn_{0.25}Sr_{0.25}Ni_{0.5}PO_4$, $LiZn_{0.2}Sr_{0.2}Ni_{0.6}PO_4$, $LiZn_{0.1}Sr_{0.1}Ni_{0.8}PO_4$, $LiCo_{0.25}Sr_{0.25}Ni_{0.5}PO_4$, $LiCo_{0.2}Sr_{0.2}Ni_{0.6}PO_4$, $LiCo_{0.1}Sr_{0.1}Ni_{0.8}PO_4$, $LiFe_{0.25}Sr_{0.25}Ni_{0.5}PO_4$, $LiFe_{0.2}Sr_{0.2}Ni_{0.6}PO_4$, or $LiFe_{0.1}Sr_{0.1}Ni_{0.8}PO_4$.

In an aspect, the dopant is an anion. The anion dopant can generally be any suitable anion or anionic group. The doped lithium nickel phosphate including an anion dopant can be a compound according to Formula 2

$$Li_{1-z(3+w)}NiA_z{}^w(PO_4)_{1-z} \quad \text{Formula 2}$$

wherein, in Formula 2, A is the anion dopant having an oxidation state w of −1, −2, −3 or −4; and $0 < z \leq 0.25$, or $0.01 \leq z \leq 0.25$, or $0.05 \leq z \leq 0.25$, or $0.01 \leq z \leq 0.2$, $0.01 \leq z \leq 0.15$, or $0.01 \leq z \leq 0.1$. The dopant A can be, for example, oxygen ($O^{2-}$, a halide (e.g., $F^-$, $Br^-$, $Cl^-$, $I^-$), a chalcogenide (e.g., $S^{2-}$), a nitride (e.g., $N^{3-}$), a cluster anion (e.g., $SiO_4{}^{4-}$, $SO_4{}^{2-}$, $BO_4{}^{5-}$, or $BO_3{}^{3-}$), or a combination thereof.

In an aspect the anion dopant A is $O^{2-}$, and may be present in an amount such that $0.01 \leq z \leq 0.1$. In an aspect, the anion dopant is $F^-$, and may be present in an amount such that $0.01 \leq z \leq 0.1$. In an aspect, the anion dopant is $SiO_4{}^{4-}$, and may be present in an amount such that $0.01 \leq z \leq 0.1$.

Exemplary doped lithium nickel phosphate compounds can include, but are not limited to, $Li_{0.94}NiO_{0.06}(PO_4)_{0.94}$, $Li_{1.06}Ni(SiO_4)_{0.06}(PO_4)_{0.94}$, or $Li_{0.88}NiF_{0.06}(PO_4)_{0.94}$.

In an aspect, the dopant is an anion and can be doped into the polyanion of the lithium nickel phosphate. For example, the doped lithium nickel phosphate including an anion dopant can be a compound according to Formula 3

$$Li_{1-n(2+w)}NiP(O_{1-n}X_n{}^w)_4 \quad \text{Formula 3}$$

wherein, in Formula 3, X is the anion dopant and can have an oxidation state w of −1, −2, or −3. For example, X can be a halide, a chalcogenide, a nitride, or a combination thereof. In Formula 3, $0 < n \leq 0.25$, or $0.01 \leq n \leq 0.25$, or $0.1 \leq n \leq 0.25$, or $0.1 \leq n \leq 0.2$. In an aspect, the anion X can have an oxidation state w of −1. For example, X can be F, Cl, Br, I, or a combination thereof. In an aspect, X can be F.

In an aspect, the dopant can be a combination of an anion and a metal cation. The anion and the metal cation can each be as described in detail above. When the metal cation is used in combination with the anion, a single metal cation can be used. Stated another way, a combination of metal cations having different ionic radii is not required when used in combination with an anionic dopant.

In an aspect, the dopant can be a combination of an anion and a metal cation and the doped lithium nickel phosphate can be a compound according to Formula 4

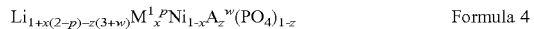

$$Li_{1+x(2-p)-z(3+w)}M^1{}_x{}^pNi_{1-x}A_z{}^w(PO_4)_{1-z} \quad \text{Formula 4}$$

wherein, in Formula 4, $M^1$ is a transition metal having an oxidation state p, wherein p is +1, +2, +3, or +4; A is a dopant having an oxidation state w of −1, −2, −3, or −4; $0 < z \leq 0.25$; and $0 < x \leq 0.25$. In an aspect, $0.01 \leq x \leq 0.25$, or $0.05 \leq x \leq 0.25$, or $0.1 \leq x \leq 0.25$, or $0.15 \leq x \leq 0.25$, or $0.1 \leq x \leq 0.2$. In an aspect, $0.01 \leq z \leq 0.25$, or $0.05 \leq z \leq 0.25$, or $0.01 \leq z \leq 0.2$, $0.01 \leq z \leq 0.15$, or $0.01 \leq z \leq 0.1$.

In an aspect, the dopant can be the combination of an anion and a metal cation wherein the anionic dopant is doped into the polyanion structure of the lithium nickel phosphate, and the doped lithium nickel phosphate can be a compound according to Formula 5

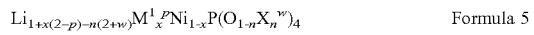

$$Li_{1+x(2-p)-n(2+w)}M^1{}_x{}^pNi_{1-x}P(O_{1-n}X_n{}^w)_4 \quad \text{Formula 5}$$

wherein, in Formula 5, $M^1$ is a transition metal having an oxidation state p, wherein p is +1, +2, +3, or +4; X is a halide, a chalcogenide, a nitride, or a combination thereof, wherein X has an oxidation state w of −1, −2, or −3; $0 < n \leq 0.25$; and $0 < x \leq 0.25$. For example, $0.01 \leq x \leq 0.25$, or $0.05 \leq x \leq 0.25$, or $0.1 \leq x \leq 0.25$, or $0.15 \leq x \leq 0.25$, or $0.1 \leq x \leq 0.2$. In an aspect, $0 \leq n \leq 0.25$, or $0.01 \leq n \leq 0.25$, or $0.1 \leq n \leq 0.25$, or $0.1 \leq n \leq 0.2$. In an aspect, the anion X can have an oxidation state w of −1. For example, X can be F, Cl, Br, I, or a combination thereof. In an aspect, X can be F.

The doped lithium nickel phosphate of the present disclosure can have an orthorhombic crystal symmetry. Incorporation of the dopant in the lithium nickel phosphate structure can provide local distortions, which may be detected as changes in the lattice constants as determined by X-ray diffraction (XRD). For example, the doped lithium nickel phosphate can exhibit an increase or a decrease in a lattice constant relative to the corresponding undoped lithium nickel phosphate of less than 5%. In an aspect, the doped lithium nickel phosphate can exhibit an increase or decrease in volume constant relative to the corresponding undoped lithium nickel phosphate of less than 10% per formula unit, for example when 50% of the Ni sites have been doped. The term "lattice constant" as used herein is intended to define a parameter defining the unit cell of a crystal lattice, i.e., the length of one of the edges of the cell or an angle between the edges of the cell.

In an aspect, the doped lithium nickel phosphate can have a major peak at a diffraction angle of 15 to 40 degrees 2θ when analyzed by powder X-ray diffraction using Cu Kα radiation. In an aspect, the major diffraction peak can be shifted by less than ±3 degrees 2θ relative to a major peak of the corresponding undoped lithium nickel phosphate. In an aspect, one or more diffraction peaks can be split (e.g., due to the presence of dopants) relative to the corresponding diffraction peaks of the corresponding undoped lithium nickel phosphate.

The positive electrode active material described herein can be manufactured by contacting precursor compounds, e.g., a lithium precursor, a nickel precursor, a phosphate precursor, and at least one of an anionic dopant precursor and a metal precursor to form a mixture. In an aspect, the contacting can be in the presence of the solvent. In an aspect, the positive electrode active material can be prepared by a solid-state synthesis method (i.e., no solvent is present). When an anionic dopant is used, the anionic dopant precursor can comprise, for example, a silicon oxide, a borate, a fluoride, a chloride, or the like, depending on the desired anionic dopant. The precursor compounds can be contacted in stoichiometric amounts to provide a mixture having suitable stoichiometry of the elements of the product positive electrode active material. The method can further include treating the mixture to provide the positive electrode active material. The treating may comprise heat-treating, or mechanochemically milling, e.g., ball milling. The heat-treating may use any suitable atmosphere, such as air, nitrogen, argon, helium, or a combination thereof, at a suitable temperature, such as 500° C. to 1000° C., 600° C. to 800° C., for a time effective to provide the solid-state ion conductor, e.g., 0.5 to 20 hours, 2 to 15 hours, or 3 to 10 hours. The mechanochemically milling can be conducted under any suitable atmosphere, e.g., in air, using any suitable medium, e.g., using zirconia balls in a stainless steel container. Use of milling for 1 to 100 hours, or 10 to 30 hours, at 200 to 1000 RPM, 225 to 600 RPM, or 250 to 450 RPM is mentioned. Additional details of the method can be determined by one of skill in the art without undue expectation.

The positive electrode active material described herein can be particularly useful in a component of an electrochemical cell. Another aspect of the present disclosure is a positive electrode comprising the positive active material. For example, a positive electrode can comprise a positive electrode active material comprising a compound according to Formula 1, a compound according to Formula 2, a compound according to Formula 3, a compound according to Formula 4, a compound according to Formula 5, or a combination thereof.

The positive electrode can be formed by forming a layer comprising the positive electrode active material on a current collector. For example, a positive electrode mixture can be prepared by adding solid electrolyte particles and a solvent to the positive electrode active material, and the positive electrode mixture can be coated and dried on a current collector to provide the positive electrode. The solvent can be any suitable solvent and is not particularly limited as long as it can be used in preparation of a positive electrode mixture. The solvent can be a non-polar solvent. The non-polar solvent does not easily react with a solid electrolyte particle. Subsequently, the positive electrode mixture thus prepared is coated and dried on a current collector by using, for example, a doctor blade. Then, the current collector and a layer of the cathode mixture can be compressed by using a roll-press to prepare the positive electrode layer.

The positive electrode layer can include an additive, for example, a conducting agent, a binding agent, an electrolyte, a filler, a dispersing agent, or an ion conducting agent, which can be appropriately selected and combined, in addition to positive electrode active material comprising the core and the coating, as described above.

The conductive agent can include, for example, carbon black, carbon fiber, graphite, carbon nanotubes, graphene, graphene nanoribbon, fullerenes, or a combination thereof. The carbon black can be, for example, acetylene black, Ketjen black, Super P carbon, channel black, furnace black, lamp black, thermal black, or a combination thereof. The graphite can be a natural graphite or an artificial graphite. A combination comprising at least one of the foregoing conductive agents can be used. The positive electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing additional conductors can be used. In an aspect, the conducting agent can include graphite, carbon black, acetylene black, Ketjen black, carbon fibers, or a metal powder.

A binder for the positive electrode can facilitate adherence between components of the positive electrode, such as the positive active material and the conductor, and adherence of the positive electrode to a current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the positive electrode to the current collector may be suitably strong.

The positive electrode can further comprise an electrolyte. When present, the electrolyte can be a solid electrolyte and can comprise a ceramic, glass ceramic, or polymer. The solid electrolyte can be of the same composition as the electrolyte in the separator, or it can be selected to be more electrochemically stable with the positive active material. Examples of the electrolyte can include an oxide-based solid electrolyte, which will be described in detail below. Also, the filler, the dispersing agent, and the ion conducting agent can be selected from commercially available materials for the manufacture of an electrode of an electrochemical cell.

Another aspect of the present disclosure is an electrochemical cell comprising the positive electrode active material described herein. The electrochemical cell can be fabricated in any suitable shape, and can be prismatic or cylindrical, and can have a wound or stacked configuration. The shape of the electrochemical cell is not limited to the above-mentioned shapes and can be shaped in various forms other than the foregoing.

In an aspect, the electrochemical cell of the present disclosure comprises a positive electrode comprising the positive electrode active material described above, a negative electrode, and an electrolyte between the positive electrode and the negative electrode. In an aspect, the electrochemical cell of the present disclosure comprises a positive electrode comprising the positive electrode active material described above, a negative electrode, and a separator between the positive electrode and the negative electrode.

The positive electrode can be as described above.

The negative electrode can be produced from a negative active material composition including a negative active material, and optionally, a conductive agent, or a binder. The negative active materials that can be used in the electrochemical cell include materials capable of storing and releasing lithium ions electrochemically. Such negative electrode active material can be a well-known negative electrode active material for lithium-ion batteries such as hard carbon, soft carbon, carbon black, ketjen black, acetylene black, activated carbon, carbon nanotubes, carbon fiber, amorphous carbon, or other carbon materials. Also usable are lithium-containing metals and alloys, wherein the metal can be any suitable metal, e.g., Si, Sn, Sb, Ge. Lithium-containing metal oxides, metal nitrides, and metal sulfides are also useful, in particular wherein metal can be Ti, Mo, Sn, Fe, Sb, Co, V. Also useable are phosphorous (P) or metal doped phosphorous (e.g., $NiP_3$). The negative active material is not limited to the foregoing and any suitable negative active material can be used. The negative electrode can be produced by a method similar to that used to obtain the positive electrode.

In an aspect, the negative electrode comprises graphite. In an aspect, the negative electrode comprises lithium metal.

As the separator, when present, a porous olefin film such as polyethylene and polypropylene, and polymer electrolyte can be used. The separator can be porous, and a diameter of a pore of the separator can be in a range of 0.01 to 10 micrometers (μm), and a thickness of the separator can be in a range of 5 to 300 μm. In greater detail, the separator can be a woven or a non-woven fabric comprising an olefin-based polymer such as polypropylene or polyethylene; or a glass fiber.

The electrolyte disposed between the positive electrode and the negative electrode may be a solid electrolyte, for example an inorganic solid electrolyte. In an aspect, the solid electrolyte can be an oxide solid electrolyte.

Examples of the oxide solid electrolyte may include $Li_{1+x+y}Al_xTi_{2-x}Si_yP_{3-y}O_{12}$ (where $0<x\leq2$ and $0<y\leq3$), $BaTiO_3$, $Pb(Zr_aTi_{1-a})O_3$ (PZT) where $0\leq a<1$, $Pb_{1-x}La_xZr_{1-y}Ti_yO_3$ (PLZT) where $0\leq x<1$ and $0\leq y<1$, $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $Li_3PO_4$, $Li_xTi_y(PO_4)_3$ (where $0\leq x<2$ and $0\leq y<3$), $Li_xAl_yTi_z(PO_4)_3$ where $0<x<2$, $0<y<1$, and $0<z<3$, $Li_{1+x+y}(Al_aGa_{1-a})_x(Ti_bGe_{1-b})_{2-x}Si_yP_{3-y}O_{12}$ where $0\leq x\leq1$, $0\leq y\leq1$, $0\leq a\leq1$, and $0\leq b\leq1$, $Li_xLa_yTiO_3$ where $0<x<2$ and $0<y<3$, $Li_2O$, $LiOH$, $Li_2CO_3$, $LiAlO_2$, $Li_2O$—$Al_2O_3$—$SiO_2$—$P_2O_5$—$TiO_2$—$GeO_2$, or $Li_{3+x}La_3M_2O_{12}$ where M is Te, Nb, or Zr, and $0\leq x<10$. Also mentioned is a lithium garnet such as $Li_7La_3Zr_2O_{12}$ (LLZO) or $Li_{3+x}La_3Zr_{2-a}Me_aO_{12}$ (e.g., Me-doped LLZO, where Me is Ga, W, Nb, Ta, or Al, and $0\leq x\leq10$ and $0\leq a<2$). A combination comprising at least one of the foregoing may be used.

In an aspect, the oxide solid electrolyte may have any suitable structure, e.g., a garnet structure a perovskite structure, an argyrodite structure, or an amorphous structure. A representative example of a garnet solid electrolyte includes $Li_{6.5}La_3Zr_{1.5}Ta_{0.5}O_{12}$. An example of a perovskite solid electrolyte may be $Li_{0.33}La_{0.5}TiO_3$.

The solid electrolyte can be in the form of a particle, and can have, for example, a spherical form, an oval-spherical form, or the like. The particle diameter of the solid electrolyte is not particularly limited, and the solid electrolyte can have a mean particle diameter ranging, for example, from 0.01 to 30 μm, for example, 0.1 to 20 μm. As described above, the mean particle diameter refers to a number average diameter (D50) of the particle size distribution of particles obtained by scattering, or the like.

The solid electrolyte can be deposited using a film formation method, for example, by blasting, aerosol deposition, cold spraying, sputtering, chemical vapor deposition ("CVD"), spraying, or the like, thereby preparing a solid electrolyte layer. In addition, the solid electrolyte layer can be formed by pressing the solid electrolyte. In addition, the solid electrolyte layer can be formed by mixing the solid electrolyte, a solvent, a binder, on a support and pressing the resulting mixture. In this case, the solvent or the support is added to reinforce the strength of the solid electrolyte layer or prevent short-circuit of the solid electrolyte.

The electrochemical cell can be manufactured by providing a positive electrode, providing a negative electrode, and disposing an electrolyte between the positive electrode and the negative electrode to manufacture the electrochemical cell. For example, the positive electrode, the negative electrode, and the solid electrolyte, which have been formed using the above-described methods, can be stacked such that the solid electrolyte layer is disposed between the positive electrode and the negative electrode, and the resulting structure can be pressed to provide the electrochemical cell.

When the electrochemical cell further comprises a separator, the method can further comprise disposing a separator between the positive electrode and the negative electrode.

This disclosure is further illustrated by the following examples, which are non-limiting.

EXAMPLES

Example 1

The compounds described above may be prepared according to the following methods.

Example 1. $Li_{1.1}Zn_{0.2}Sr_{0.2}Mn_{0.6}PO_4$

Sr, Zn doped Ni olivine powders will be prepared for the sol-gel method. Precursor solutions will be lithium acetate (2.5M in $H_2O$), nickel acetate (2M in $H_2O$), diammonium hydrogen phosphate (1M in $H_2O$), strontium nitrate (0.5M in $H_2O$), zinc nitrate (2M in $H_2O$), and citric acid (1M in $H_2O$). The precursor solutions will be combined in appropriate ratios based on desired stoichiometry. Citric acid will be added in a 1:1 ratio with total metals, and to provide a total dispensed volume of 1.5 mL per sample. The precursor mixture will be dried under cyclical vacuum for 8 hours at 80° C. followed by 2 hours of pyrolysis at 250° C. to produce a dry fine powder. Powders will be transferred for calcination to a furnace, and calcined in air from 250° C. to 600° C. (4 hours ramp), held for 2 hours at 600° C., ramped from 600° C. to 750° C. over 0.5 hours, and held at 750° C. for 12 hours to provide $Li_{1.1}Zn_{0.2}Sr_{0.2}Mn_{0.6}PO_4$. The product will be analyzed by X-ray powder diffraction (XRD) using CuK α radiation, and XRD analysis will show that $Li_{1.1}Zn_{0.2}Sr_{0.2}Mn_{0.6}PO_4$ is prepared.

Pristine $LiNiPO_4$ exhibits an average voltage of 4.97 V. $LiZn_{0.25}Sr_{0.25}Ni_{0.5}PO_4$ will exhibit a voltage, for example, of 4.76V.

Various aspects are shown in the accompanying drawings. This invention may, however, be embodied in many different forms, and should not be construed as limited to the aspects set forth herein. Rather, these aspects are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, or sections, these elements, components, regions, layers, or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer or section without departing from the teachings herein.

The terminology used herein is for the purpose of describing particular aspects only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises" and/or "comprising," or "includes" or "including" when used in this specification, specify the presence of stated features, regions, integers, steps, operations, elements, or components, but do not preclude the presence or addition of one or more other features, regions, integers, steps, operations, elements, components, or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary aspects are described herein with reference to cross section illustrations that are schematic illustrations of idealized aspects. As such, variations from the shapes of the illustrations as a result, for example, of manufacturing techniques and/or tolerances, are to be expected. Thus, aspects described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Oxidation state" as used herein is a formalism used to describe a hypothetical charge that an atom would have if all bonds to atoms of different elements were 100% ionic, with no covalent component.

"Group" means a group of the Periodic Table of the Elements according to the International Union of Pure and Applied Chemistry ("IUPAC") Group 1-18 group classification system.

While a particular aspect has been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A positive electrode active material comprising:
a doped lithium nickel phosphate having an olivine structure comprising distorted $NiO_6$ octahedra,
wherein the dopant is a combination of at least two transition metals having different ionic radii, and the doped lithium nickel phosphate is a compound of Formula 1

$$Li_{1+x(2-p)+y(2-q)}M^1{}_x{}^pM^2{}_y{}^qNi_{1-x-y}PO_4 \qquad \text{Formula 1}$$

wherein
$M^1$ is a transition metal having an oxidation state p, wherein p is +1, +2, +3, or +4;
$M^2$ is a transition metal having an oxidation state q, wherein q is +1, +2, +3, or +4,
$0 < x \le 0.25$;
$0 < y \le 0.25$; and
$M^1$ has an ionic radius that is not equal to $M^2$; or
wherein the dopant is an anion and the doped lithium nickel phosphate is a compound of Formula 2

$$Li_{1-z(3+w)}NiA_z{}^w(PO_4)_{1-z} \qquad \text{Formula 2}$$

wherein
A is the anion dopant having an oxidation state w of −1, −2, −3 or −4; and
$0 < z \le 0.25$; or wherein the dopant is an anion and the doped lithium nickel phosphate is a compound of Formula 3

$$Li_{1-n(2+w)}NiP(O_{1-n}X_n^w)_4 \qquad \text{Formula 3}$$

wherein
X is a halide, a chalcogenide, a nitride, or a combination thereof, wherein X has an oxidation state w of −1, −2, or −3; and
0<n≤0.25, or
wherein the dopant is an anion and a metal cation and the doped lithium nickel phosphate is a compound of Formula 4

$$Li_{1+x(2-p)-z(3+w)}M^1_x{}^pNi_{1-x}A_z^w(PO_4)_{1-z} \qquad \text{Formula 4}$$

wherein
$M^1$ is a transition metal having an oxidation state p, wherein p is +1, +2, +3, or +4;
A is a dopant having an oxidation state w of −1, −2, −3, or −4;
0<z≤0.25; and
0<x≤0.25; or
wherein the dopant is an anion and a metal cation and the doped lithium nickel phosphate is a compound of Formula 5

$$Li_{1+x(2-p)-n(2+w)}M^1_x{}^pNi_{1-x}P(O_{1-n}X_n^w)_4 \qquad \text{Formula 5}$$

wherein
$M^1$ is a transition metal having an oxidation state p, wherein p is +1, +2, +3, or +4;
X is a halide, a chalcogenide, a nitride, or a combination thereof, wherein X has an oxidation state w of −1, −2, or −3;
0<n≤0.25; and
0<x≤0.25.

2. The positive electrode active material of claim 1, wherein the dopant is the combination of at least two transition metals having different ionic radii, and the doped lithium nickel phosphate is the compound of Formula 1

$$Li_{1+x(2-p)+y(2-q)}M^1_x{}^pM^2_y{}^qNi_{1-x-y}PO_4 \qquad \text{Formula 1}$$

wherein
$M^1$ is a transition metal having an oxidation state p, wherein p is +1, +2, +3, or +4;
$M^2$ is a transition metal having an oxidation state q, wherein q is +1, +2, +3, or +4;
0<x≤0.25;
0<y≤0.25; and
$M^1$ has an ionic radius that is not equal to $M^2$.

3. The positive electrode active material of claim 2, wherein $M^1$ and $M^2$ are each independently selected from Al, Sc, Fe, Co, Cu, Zn, Ga, As, Y, In, Sb, Sr, Ag, Cd, Sn, Hg, and Pb, provided that $M^1$ and $M^2$ are not the same.

4. The positive electrode active material of claim 2, wherein the ionic radii of $M^1$ and $M^2$ are not equal to the ionic radius of Ni.

5. The positive electrode active material of claim 2, wherein $M^1$ has an ionic radius less than or equal to 0.65 Å and $M^2$ has an ionic radius greater than or equal to 0.73 Å.

6. The positive electrode active material of claim 2, wherein $M^1$ has an ionic radius less than 0.69 Å and $M^2$ has an ionic radius greater than 0.69 Å.

7. The positive electrode active material of claim 2, wherein $M^1$ is Al, Fe, Co, Ga, or As, and $M^2$ is Sc, Cu, Zn, Y, In, Sb, Sr, Ag, Cd, Sn, Hg, or Pb.

8. The positive electrode active material of claim 2, wherein $M^1$ and $M^2$ each have an ionic radius that is greater than or equal to 0.73 Å.

9. The positive electrode active material of claim 2, comprising a compound of the formula $LiZn_{0.25}Sr_{0.25}Ni_{0.5}PO_4$, $LiZn_{0.2}Sr_{0.2}Ni_{0.6}PO_4$, $LiZn_{0.1}Sr_{0.1}Ni_{0.8}PO_4$, $LiCo_{0.25}Sr_{0.25}Ni_{0.5}PO_4$, $LiCo_{0.2}Sr_{0.2}Ni_{0.6}PO_4$, $LiCo_{0.1}Sr_{0.1}Ni_{0.8}PO_4$, $LiFe_{0.25}Sr_{0.25}Ni_{0.5}PO_4$, $LiFe_{0.2}Sr_{0.2}Ni_{0.6}PO_4$, or $LiFe_{0.1}Sr_{0.1}Ni_{0.8}PO_4$.

10. The positive electrode active material of claim 1, wherein the dopant is the anion and the doped lithium nickel phosphate is the compound of Formula 2

$$Li_{1-z(3+w)}NiA_z^w(PO_4)_{1-z} \qquad \text{Formula 2}$$

wherein
A is a dopant having an oxidation state w of −1, −2, −3 or −4; and
0<z≤0.25.

11. The positive electrode active material of claim 10, wherein the dopant A is oxygen, a halide, a chalcogenide, a nitride, a cluster anion, or a combination thereof.

12. The positive electrode active material of claim 11, wherein
the halide is $F^-$,
the chalcogenide is $S^{2-}$,
the nitride is $N^{3-}$, and
the polyanion is $SiO_4^{4-}$, $SO_4^{2-}$, $BO_4^{5-}$, or $BO_3^{3-}$.

13. The positive electrode active material of claim 10, wherein the doped lithium nickel phosphate is a compound of the formula $Li_{0.94}Ni_{0.06}(PO_4)_{0.94}$, $Li_{1.06}Ni(SiO_4)_{0.06}(PO_4)_{0.94}$, or $Li_{0.88}NiF_{0.06}(PO_4)_{0.94}$.

14. The positive electrode active material of claim 1, wherein the dopant is the anion and the doped lithium nickel phosphate is the compound of Formula 3

$$Li_{1-n(2+w)}NiP(O_{1-n}X_n^w)_4 \qquad \text{Formula 3}$$

wherein
X is a halide, a chalcogenide, a nitride, or a combination thereof, wherein X has an oxidation state w of −1, −2, or −3; and
0<n≤0.25.

15. The positive electrode active material of claim 14, wherein X is the halide and is F, Cl, Br, or I.

16. The positive electrode active material of claim 1, wherein the dopant is the anion and the metal cation and the doped lithium nickel phosphate is the compound of Formula 4

$$Li_{1+x(2-p)-z(3+w)}M^1_x{}^pNi_{1-x}A_z^w(PO_4)_{1-z} \qquad \text{Formula 4}$$

wherein
$M^1$ is a transition metal having an oxidation state p, wherein p is +1, +2, +3, or +4;
A is a dopant having an oxidation state w of −1, −2, −3, or −4;
0<z≤0.25; and
0<x≤0.25.

17. The positive electrode active material of claim 1, wherein the dopant is the anion and the metal cation and the doped lithium nickel phosphate is the compound of Formula 5

$$Li_{1+x(2-p)-n(2+w)}M^1_x{}^pNi_{1-x}P(O_{1-n}X_n^w)_4 \qquad \text{Formula 5}$$

wherein
$M^1$ is a transition metal having an oxidation state p, wherein p is +1, +2, +3, or +4;
X is a halide, a chalcogenide, a nitride, or a combination thereof, wherein X has an oxidation state w of −1, −2, or −3;
0<n≤0.25; and
0<x≤0.25.

18. A positive electrode comprising the positive electrode active material of claim 1.

19. An electrochemical cell comprising
the positive electrode of claim 18;
a negative electrode; and
a separator between the positive electrode and the negative electrode.

20. An electrochemical cell comprising
the positive electrode of claim 18;
a negative electrode; and
a solid electrolyte between the positive electrode and the negative electrode.

\* \* \* \* \*